May 21, 1929.   C. H. DENNISON   1,713,746
IMITATION LEATHER
Filed Nov. 14, 1925
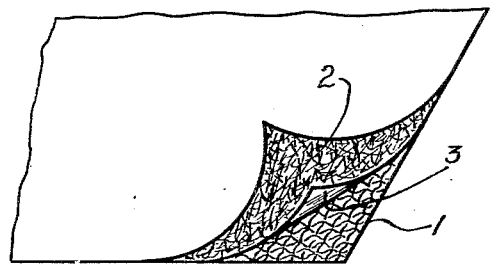
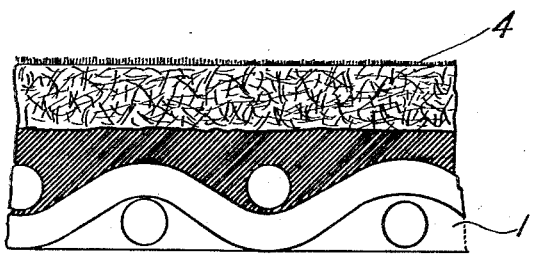
Inventor
CHARLES H. DENNISON
By his Attorney Patented May 21, 1929.

1,713,746

UNITED STATES PATENT OFFICE.

CHARLES H. DENNISON, OF QUINCY, MASSACHUSETTS, ASSIGNOR TO AMERICAN RUBBER COMPANY, OF EAST CAMBRIDGE, MASSACHUSETTS, A CORPORATION OF MASSACHUSETTS.

IMITATION LEATHER.

Application filed November 14, 1925. Serial No. 68,998.

This invention relates to the manufacture of imitation leather and more particularly a type thereof embodying rubber composition and fibres.

The invention aims to provide a new and useful product capable of being employed in wearing apparel such as coats and footwear and having an attractive appearance closely resembling what is known as suede leather. An object of the invention is to provide a material which can be manufactured expeditiously and economically with equipment already available in rubber factories. It also aims to provide a product which is not only waterproof and therefore desirable for manufacturing such articles as rain coats and shoes, spats, etc., but also has a more attractive appearance and feel than rubber products heretofore available, and hence better meets the demands of the trade. These are some of the objects of the invention. Others will be obvious from the description hereinafter stated.

With the illustrated embodiment of the invention in mind without intention to limit its scope, the invention briefly stated consists in securing a fibrous rubber composition to a backing of woven fabric or other suitable strain-resisting material, and after vulcanization, abrading to expose minute ends of the fibres, constituting a pile or nap practically invisible to the eye, and finally treating with a halogen, such as bromine to form an indurated surface that is not tacky and adhesive and much like suede leather to the touch.

An embodiment of the invention is illustrated in the accompanying drawings in which:

Figure 1 is a perspective view of a fragment of the material with the laminations peeled back, and Figure 2 is a cross section on an enlarged scale.

Referring to the drawings, the product of the present invention in its preferred form comprises a strain-resisting backing 1 and a facing of vulcanized fibrous rubber composition 2, secured to the backing in any suitable manner, preferably by an intermediate stratum of vulcanized rubber composition 3. Free ends or extremities of the fibres in the fibrous rubber composition are exposed and project from the surface a short distance practically invisible to the naked eye, as indicated at 4, forming an irregular pile or nap.

While any suitable and convenient materials may be employed, the strain-resisting backing 1 is preferably made of a small mesh woven fabric but knitted or felted fabrics might be utilized or any other flexible textile sheet material. The layer 2 of fibrous rubber composition may be variously compounded, but the following formula has been found satisfactory and is given as typical:—

| | Parts. |
|---|---|
| Ceylon | 32 |
| Fibre | 32 |
| Accelerator (triethyl trimethylene amine) | ¾ |
| Zinc oxide | 2 |
| Lithopone | 4 |
| Black | 1 |
| Montan wax | 2 |
| Whiting | 20 |
| Sulphur | 1 |

Of course the ingredients and their proportions may be varied within wide limits.

The stratum or film 3 may be of any composition of rubber to give good adhesion between the backing 1 and the fibrous composition layer 2, for instance, rubber, sulphur, and the usual reclaim, softeners, pigments, and fillers. It is preferred to employ such a uniting stratum 3 which may be applied on a calender or by a spreader as well known in the art, but if the percentage of fibres to rubber is not too great, the rubber constituent of the fibrous composition layer 2 may in some cases be utilized to effect a sufficiently strong union. However, as before indicated, it is preferred for reliability in manufacture to employ an intermediate stratum 3 of rubber composition to effect a firm union of the fibrous layer 2 to the backing 1.

The fibrous rubber composition layer 2 may be prepared in any suitable and convenient manner. Preferably the ingredients composing the same are mixed on a mill as usual, and then desirably churned with a quantity of solvent, in a mixer such as the well known Werner and Pfleiderer. The fibre may be cotton, wool, silk flock, or flock of a mixture of different fibres. After preparing the fibrous rubber composition and more or less uniformly distributing the fibres in the mass of the compound, it may be applied to the backing which has preferably been already coated with rubber by calendering or in any other convenient manner.

After the backing has been surfaced with the fibrous rubber composition, and preferably with an intermediate thin layer of rubber 3 for binding purposes, the sheet material is vulcanized. Preferably this is accomplished by festooning in a heated oven, but it may be accomplished in any other manner convenient.

After the material has been vulcanized the surface of the fibrous rubber composition 2 is roughened or abraded as for instance by treatment with a sand paper roll revolving at a relatively high speed to score the surface of the rubber compound and to expose short lengths of the ends of the fibres thereby forming a short irregular pile or nap as illustrated diagrammatically at 4. This produces a finished surface having very much the appearance of suede leather but to more closely duplicate suede leather it is desirable to also treat the exposed face of the fibrous rubber composition with a weak solution of bromine, around say 3%. Instead of bromine however, other halogens or sulphur chloride may be employed with more or less advantage. This halogenating treatment hardens the surface superficially and produces an indurated surface. Rubber materials for similar purposes as heretofore manufactured have either had a soft clingy tacky feel or they had a hard dry feel. But the product of the present invention very closely approximates the feel of suede leather and thus obviates the criticism of many in the trade to waterproof wearing apparel, clothing or footwear that heretofore has obtained.

While the thickness of the finished product of course depends upon the gauges of stock employed, and while these gauges may be varied as desired to meet the requirements of the particular articles into which the material may be manufactured, it is deemed expedient to make the intermediate stratum 3 of rubber composition when employed, of a gauge of 3 to 8 thousandths of an inch, and the fibrous rubber composition layer 2 of a gauge of 5 to 10 thousandths of an inch. Of course, however, the fibrous rubber composition may be most readily varied in thickness to control the all-over thickness of the finished imitation leather.

While it is preferred to apply the fibrous rubber composition to only one face of the backing, it may of course be applied to both sides of the backing if desired.

Reference is made to the accompanying claims for a full understanding of the scope of the invention which is not intended to be limited to details and which comprehends modifications within the underlying principles thereof.

Having thus described my invention, what I claim and desire to protect by Letters Patent is:

1. An imitation leather consisting of a strain-resisting flexible backing having secured thereto a layer of fibrous vulcanized rubber composition having an abraded surface resembling suede leather.

2. An imitation leather consisting of a layer of strain-resisting fabric, a layer of vulcanized fibrous rubber composition, and an intermediate layer of rubber composition uniting the two first layers together, the exposed surface of the vulcanized fibrous rubber composition being abraded and indurated.

3. The process of manufacturing an imitation leather which consists in coating a strain-resisting backing of flexible material with rubber composition, applying a layer of fibrous rubber composition to said coating, vulcanizing the assemblage, and abrading the vulcanized product so as to expose the ends of the fibres.

4. The process of manufacturing an imitation leather which consists in coating a strain-resisting backing of flexible material with rubber composition, applying a layer of fibrous rubber composition to said coating, vulcanizing the assemblage, abrading the vulcanized product so as to expose the ends of the fibres, and treating the abraded surface with a halogen to indurate the rubber composition of the visible face.

5. An imitation suede leather consisting of a strain-resisting flexible backing having secured thereto a layer of vulcanized rubber composition and a layer of fibrous rubber composition, the surface of said composition being abraded and the ends of the fibers being exposed and projecting minutely so as to be practically invisible to the naked eye.

Signed at Cambridge, county of Middlesex, and State of Massachusetts, this ninth day of November, 1925.

CHARLES H. DENNISON.